Dec. 1, 1931.   H. E. PERLAIN   1,834,135
AIRPLANE
Filed July 5, 1928   3 Sheets-Sheet 2
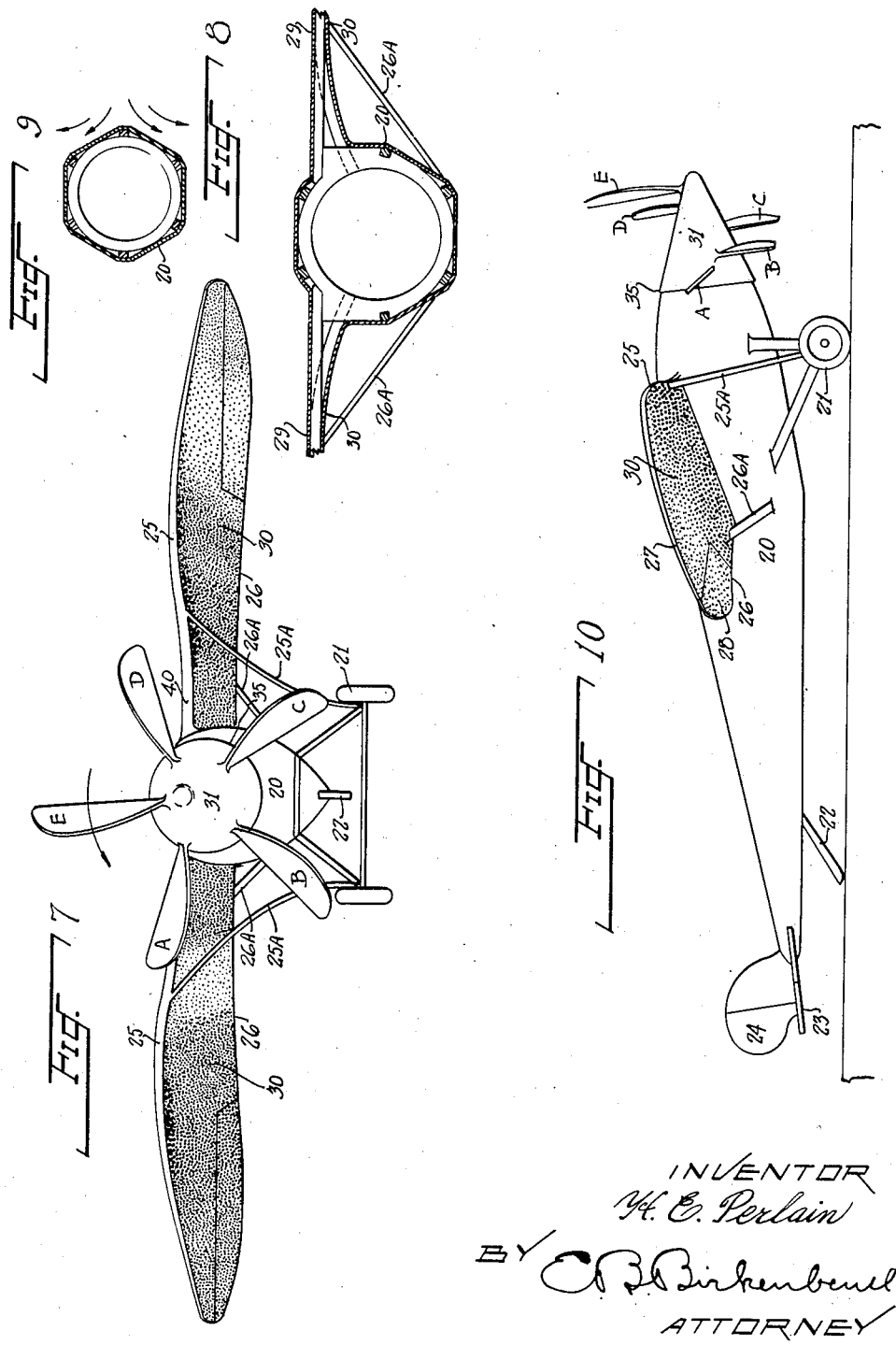
INVENTOR
H. E. Perlain
BY
ATTORNEY Dec. 1, 1931.  H. E. PERLAIN  1,834,135
AIRPLANE
Filed July 5, 1928   3 Sheets-Sheet 3
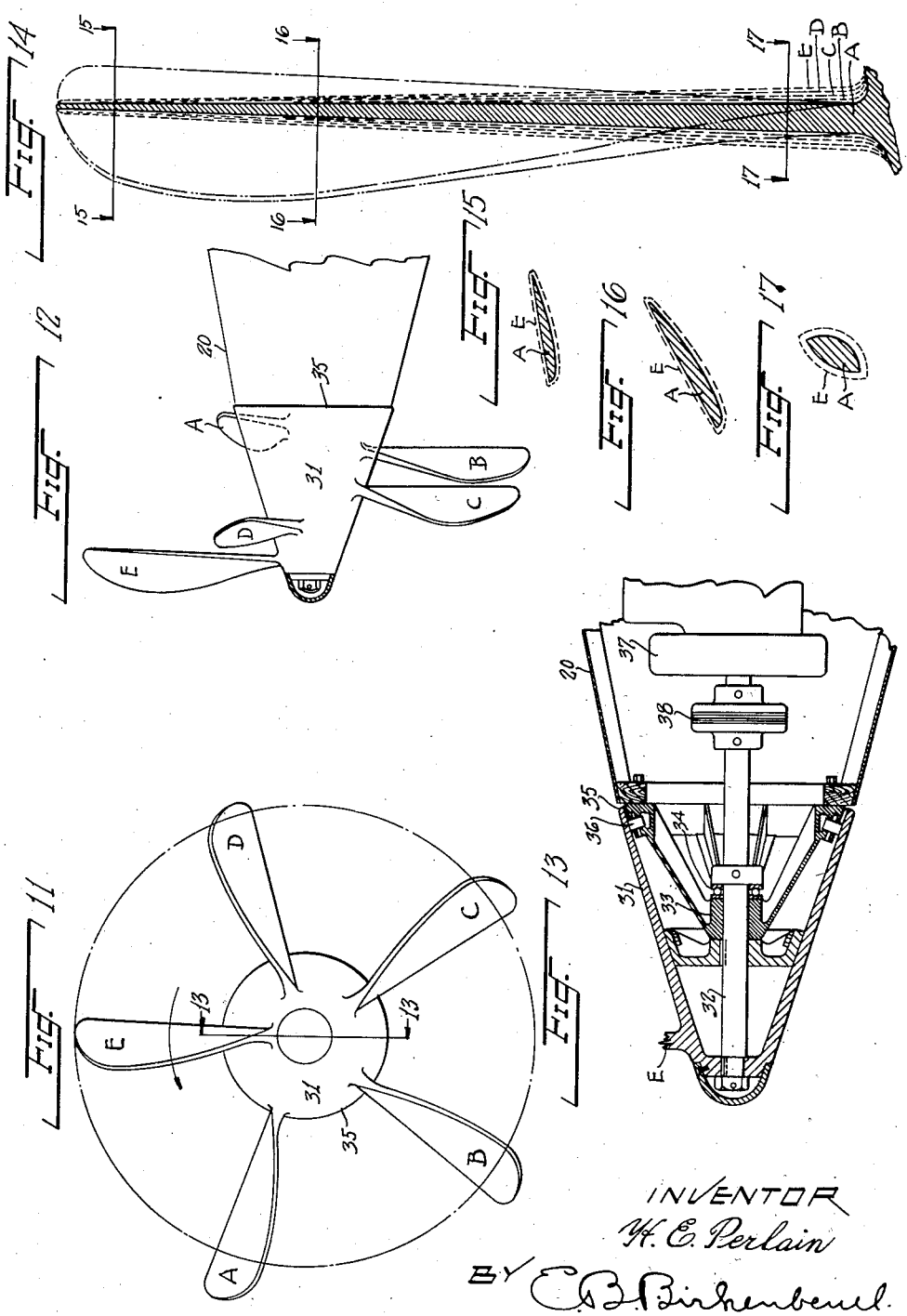

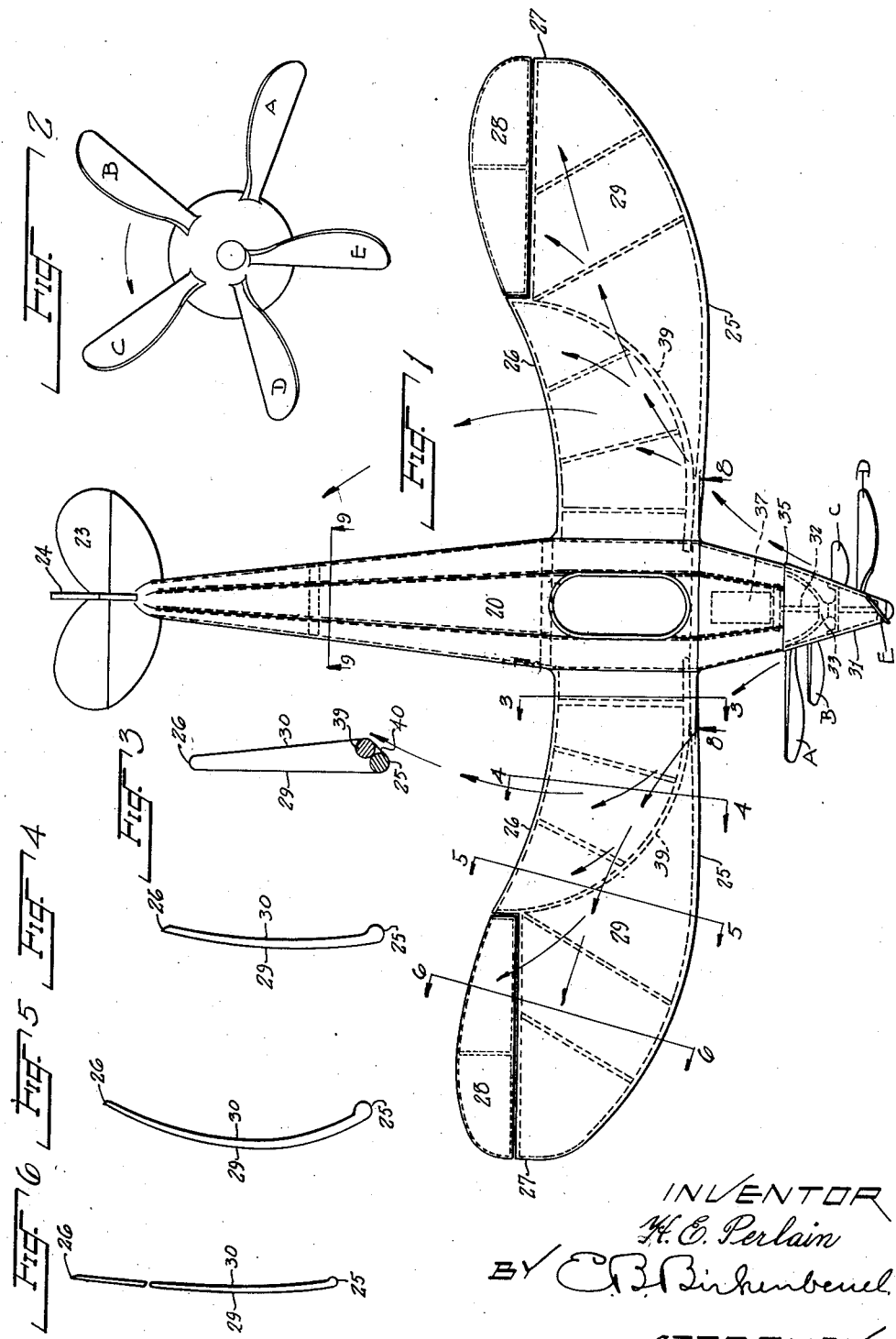

Patented Dec. 1, 1931

1,834,135

UNITED STATES PATENT OFFICE

HANS E. PERLAIN, OF PORTLAND, OREGON

AIRPLANE

Application filed July 5, 1928. Serial No. 290,590.

This invention relates generally to aviation, and particularly to a new type of airplane and means for propelling same.

The main object of this invention is to increase the lift of the plane by transferring the load from the motor to the wing.

The second object is to eliminate tail spins.

The third object is to greatly reduce the size of runway required.

The fourth object is to increase the gliding ability of the plane.

The fifth object is to provide a special form of propeller which will operate satisfactorily in any wind regardless of its direction or velocity.

The sixth object is to increase the flying radius of the plane due to the highly efficient form of the propeller and its relation to the special wings, in order that the number and size of engines may be cut down to a minimum, thereby increasing the pay load which can be carried, as well as the amount of fuel which can be carried, which, in turn, increases the flying radius of the plane.

The seventh object is to increase the gliding radius of the plane in order that it may glide long distances for the purpose of finding a satisfactory landing field.

The eighth object is to provide an airplane which will be capable of rising from the ground on a relatively short runway, as well as making a landing in the same manner.

The ninth object is to shape the wings of the plane in close resemblance to that of a bird in order to secure the maximum amount of load-sustaining effect therefrom, and in addition thereto to overcome to a large extent accumulations of snow or sleet on the surface of the plane wings.

The tenth object is to utilize wind currents which ordinarily oppose the flight of a plane to increase the speed of the propeller without in any way hindering the flight of the plane.

These, and other objects, will become more apparent from the specification following as illustrated in the accompanying drawings, in which:

Figure 1 is a plan of the airplane showing the air currents. Figure 2 is a front view of the propeller. Figure 3 is a somewhat diagrammatic outline of the wing shape along the line 3—3 in Fig. 1. Figure 4 is an outline of the wing shape along the line 4—4 in Fig. 1. Figure 5 is an outline of the wing shape along the line 5—5 in Fig. 1. Figure 6 is an outline of the wing shape along the line 6—6 in Fig. 1. Figure 7 is a front elevation of the plane. Figure 8 is a section taken along the line 8—8 in Fig. 1. Figure 9 is a section taken along the line 9—9 in Fig. 1. Figure 10 is a side elevation of the plane. Figure 11 is a front elevation of the propeller. Figure 12 is a side elevation of the propeller. Figure 13 is a section taken along the line 13—13 in Fig. 11. Figure 14 is a section through the blade marked "A" with dotted lines to show the increasing thicknesses of blades as they approach the axis of the shaft. Figure 15 is a section taken along the line 15—15 in Fig. 14 showing in dotted lines the thickest blade. Figure 16 is a section taken along the line 16—16 in Fig. 14. Figure 17 is a section taken along the line 17—17 in Fig. 14.

Similar numbers of reference refer to similar parts throughout the several views.

Referring in detail to the drawings, there is shown a fuselage 20, preferably of hexagonal shape, having the usual landing gear 21 and tail skid 22, also elevators 23 and rudder 24.

The plane illustrated is of the monoplane type and its wings differ materially from those in common use. The forward edges 25 and the rearward edges 26 curve backwardly toward the outer end 27, which, with the aileron 28, forms a somewhat rounded wing tip. The wings are supported by the front braces 25—A and the rear braces 26—A.

For the purpose of better illustrating the shape of the wing there is shown Figures 3 to 6 in which it will be seen that the top side 29 is convex and the under side 30 is concave, the greatest curvature being along the line 5—5 as shown in Fig. 5, from which the wing merges into a relatively straight line at each end thereof.

Turning now to the propeller it will be seen to consist of a conical hub 31 mounted on the propeller shaft 32 which, in turn, is supported by a suitable bearing 33 provided with end thrust bearings 34. The rearward edges 35 of the hub 31 are further supported by means of rollers 36. The shaft 32 is joined to the engine 37 by means of the coupling 38.

Mounted spirally around the conical hub 31 are the propellers A, B, C, D and E which are uniform in regard to length, but decrease in thickness from the front to the rear— that is, the propeller A, (which is mounted on the largest radius) is the thinnest, and the propeller E (which is mounted near the axis of the hub 31) is thickest, as is somewhat diagrammatically shown in Fig. 14. The object for placing the various blades A to E in a spiral path may readily be seen, inasmuch as each blade is practically cutting new air continually which is, of course, very desirable. In addition to this advantage is the improved action of the propeller in a side wind, together with the tendency of producing more of a lateral movement to the air than is ordinarily possible, with the result that the air is caused to move longitudinally with the wings instead of directly across same, as is ordinarily the case, thereby projecting the air which has been moved by the propeller against the entire lower side of the wing instead of only past a small portion thereof.

It will be noted in Figures 1 and 3 that the curved brace 39 appears to lie directly behind the front edge 25 of the plane (as shown in Fig. 1) but in Fig. 3 it will be seen that the brace 39 is somewhat below the edge 25 forming a sloping shoulder 40 on the front edge of the wing closest to the body of the plane, closely resembling the structure of a bird wing, giving it its greatest thickness near the body and gradually thinning out (as shown in Figures 4, 5 and 6).

I am aware that many forms of airplanes have been invented in the past; it is therefore not my intention to cover such devices broadly, but I do intend to cover all such forms and modifications thereof as fall fairly within the appended claims.

I claim:

1. An airplane consisting of a fuselage having a hexagonal cross section in combination with a pair of wings attached to said fuselage, each wing having a rearwardly curved front and back edge, an aileron at the outer end of said back edge, said aileron having a curved edge joining said front and back edge, each wing having its under portion hollow near its middle portion and gradually receding into straight opposite ends, and a spiral propeller adapted to direct air currents against the under side of said wing portion for the purpose of directing the major portion of said air along the length of said wing and a portion of said air across the back of said wing.

2. An airplane having its wings made concave on the under side thereof with the greatest concavity at the outer quarter of the wing length.

3. An airplane wing having approximately straight cross sections at its inner and outer ends, having its intermediate portion curved upwardly between its edges, and having its front and back edges curved rearwardly, the outer half of each wing having its front and rear edges in double convex relation and the inner half of each wing having a concave convex relation between its front and rear edges with the concave side leading.

4. An air foil having a backwardly bending shape in plane, the leading edge of said foil lying normal to the fuselage at the inner end of the foil and forming a convex line to the outermost foil tip, an aileron constituting a convex trailing edge for the outer half of the foil, and the inner half of the trailing edge forming a convex line between said aileron and fuselage.

HANS E. PERLAIN.